United States Patent

Nagata et al.

[11] Patent Number: 5,773,566
[45] Date of Patent: Jun. 30, 1998

[54] RESISTIVE MATERIAL COMPOSITION, RESISTIVE PASTE, AND RESISTOR

[75] Inventors: Keisuke Nagata, Kyoto; Hiroji Tani, Nagaokakyo, both of Japan

[73] Assignee: Murata Manufacturing Co., Ltd., Nagaokakyo, Japan

[21] Appl. No.: 633,883

[22] Filed: Apr. 17, 1996

[30] Foreign Application Priority Data

Apr. 18, 1995 [JP] Japan .................................. 7-117817

[51] Int. Cl.⁶ .............................. H01B 1/08; H01B 1/14; H01B 1/20; B32B 9/00
[52] U.S. Cl. .................. 252/519; 252/519.3; 252/521.1; 338/224; 428/697
[58] Field of Search .................................. 252/518, 519, 252/521, 519.13, 519.3, 519.33, 521.1, 254; 106/1.22; 75/255; 428/221, 357, 697, 924; 338/224

[56] References Cited

U.S. PATENT DOCUMENTS

| 4,536,328 | 8/1985 | Hankey | 252/518 |
| 4,814,107 | 3/1989 | Steinberg | 252/512 |

FOREIGN PATENT DOCUMENTS

| 0596481 | 2/1984 | Japan . |
| 62-5508 | 1/1987 | Japan . |
| 63-224301 | 9/1989 | Japan . |
| 2249203 | 10/1990 | Japan . |

OTHER PUBLICATIONS

Labrincha et al "Evaluation of Deposition Techniques of Cathode Materials . . . " Mat. Res. Bull, vol. 28, pp. 101–109, 1993 (no month available).

Primary Examiner—Mark Kopec
Attorney, Agent, or Firm—Ostrolenk, Faber, Gerb & Soffen, LLP

[57] ABSTRACT

Disclosed are a resistive paste that can be fired in a neutral or reducing atmosphere to give a resistor having a high sheet resistivity value and a satisfactory TCR value even on low-temperature-sintering substrates, a resistive material composition that constitutes the resistive paste, and also a resistor that is formed from the resistive paste to realize a high sheet resistivity value and a satisfactory TCR value. A resistive material $Ca_xSr_{1-x}RuO_3$ where x is from about 0.25 to 0.75 is mixed with a characteristic-improving additive of $La_ySr_{1-y}CoO_3$ where y is from about 0.40 to 0.60, and a non-reducible glass frit and an organic vehicle are added thereto to form a resistive paste.

18 Claims, 2 Drawing Sheets

CONTENT OF NON-REDUCIBLE GLASS FRIT (WT. PTS.)

CONTENT OF NON-REDUCIBLE GLASS FRIT (WT. PTS.)

CONTENT OF NON-REDUCIBLE GLASS FRIT (WT. PTS.)

RESISTIVE MATERIAL COMPOSITION, RESISTIVE PASTE, AND RESISTOR

BACKGROUND OF THE INVENTION

1. Field of the Invention

The present invention relates to a resistive material composition, a resistive paste which can be fired in a neutral or reducing atmosphere, and a resistor formed by the use of the resistive paste.

2. Description of the Related Art

In general, a ceramic substrate comprising alumina, zirconia or the like has circuit patterns for electrodes, resistors, etc., in order that various electronic parts can be mounted thereon. Electrodes (electrode patterns) are generally formed on the substrate by screen-printing a noble metal paste comprising silver, a silver-palladium alloy or the like followed by firing the thus-printed paste in air.

In order to obtain small-sized, high-density electronic products, methods for three-dimensionally disposing conductors in laminate substrates have heretofore been proposed. Where inner layers are wired and laminated on conventional high-temperature-sintering substrates, e.g., alumina substrates, refractory metals such as tungsten, molybdenum, etc. are used as conductor materials because alumina must be sintered at high temperatures. However, since the conductor materials have a high specific resistivity, they are problematic in that their use is limited and they are not practical. In order to solve this problem, substrates that can be sintered at low temperatures (not higher than 1000° C.) and that can be laminated with inner layers of electrode materials such as silver, palladium, copper, etc. have been utilized. For example, low-temperature-sintering substrates can be ceramic/glass composite substrates. As electrode materials applicable to such low-temperature-sintering substrates, noble metal pastes such as those mentioned above have been employed. However, such noble metal pastes are not only expensive but also problematic in their migration resistance. As a result, the tendency for such expensive noble metal pastes to be replaced by base metal pastes comprising, as the conductive component, copper, nickel, aluminium or the like, has become accepted in this technical field. Such base metal pastes can be screen-printed on substrates and then fired in a neutral or reducing atmosphere to give inexpensive electrode patterns. In this case, it is desirable that the resistive pastes which are to form resistors (resistor patterns) on the substrates, through which the plural base metal electrodes formed by firing the printed base metal pastes are connected with each other, can also be fired in a neutral or reducing atmosphere.

Therefore, various glass frit-containing resistive pastes that can be fired in a neutral or reducing atmosphere to form resistors (resistor patterns) have heretofore been proposed. Such resistive pastes includes, for example, resistive pastes comprising $LaB_6$ such as those described in Japanese Patent Publication No. 59-6481, resistive pastes comprising $NbB_2$ such as those described in Japanese Patent Laid-Open No. 63-224301, resistive pastes comprising solid solutions of $Nb_xLa_{1-x}B_{6-4x}$ such as those described in Japanese Patent Laid-Open No. 2-249203, and the like.

It is possible to make resistive pastes comprising $Ca_xSr_{1-x}RuO_3$ that exhibit resistance values (sheet resistivity values) which vary within a broad range by varying the mixing ratio of resistive materials to glass frit. However, the resistive pastes are problematic in that the resistance values of the resistors formed from them on low-temperature-sintering substrates such as ceramic-glass composite substrates are lowered to from 1/100 to 1/1000 or so of the resistance values of the resistors formed on alumina substrates (high-temperature-sintering substrates) and in that characteristics such as the temperature coefficient of resistance (TCR), etc. of the formed resistors are unsatisfactory. In particular, it is impossible to form resistors having high sheet resistivity values of not lower than 10 kΩ/square from such resistive pastes. For these reasons, the resistive pastes are problematic in that they could not have satisfactory characteristics that are needed in practical use. These problems are essentially caused by the movement of the glass component between the substrates and the resistors formed thereon.

SUMMARY OF THE INVENTION

The present invention is designed to solve the above-mentioned problems, and its object is to provide a resistive paste that can be fired in a neutral or reducing atmosphere to give a resistor having a high sheet resistivity value and a satisfactory TCR value even on low-temperature-sintering substrates. The resistive material composition constitutes the resistive paste, and also a resistor that is formed from the resistive paste to realize a high sheet resistivity value and a satisfactory TCR value.

Specifically, the present invention provides a resistive material composition by which the above-mentioned object is attained and which is characterized in that it comprises a resistive material (first resistive material) of the general formula $Ca_xSr_{1-x}RuO_3$ (where x is from about 0.25 to 0.75 mols) and a characteristic-improving additive (second resistive material) of the general formula $La_ySr_{1-y}CoO_3$ (where y is from about 0.40 to 0.60).

The present invention also provides a resistive material composition which is characterized in that it comprises a resistive material (first resistive material) of the general formula $Ca_xSr_{1-x}RuO_3$ (where x is from about 0.25 to 0.75), a non-reducible glass frit, and from 5 to 25 parts by weight, relative to 100 parts by weight of the sum of the first resistive material and the non-reducible glass frit, of a characteristic-improving additive (second resistive material) of the a general formula $La_ySr_{1-y}CoO_3$ (where y is from about 0.40 to 0.60 mols).

One embodiment of the resistive material composition is such that the ratio of the first resistive material to the non-reducible glass frit is from about 65:35 to 5:95 by weight.

The present invention further provides a resistive paste characterized in that it comprises the above-mentioned resistive material composition and an organic vehicle added thereto.

The resistive paste of the present invention can be used for forming resistors on a low-temperature-sintering substrate having a composition comprising from about 15 to 75% by weight of BaO, from about 25 to 80% by weight of $SiO_2$, about 30% by weight or less of $Al_2O_3$, from about 1.5 to 5% by weight of $B_2O_3$ and from about 1.5 to 5% by weight of CaO.

The present invention further provides a resistor formed by printing and firing the resistive paste on a substrate.

DETAILED DESCRIPTION OF THE INVENTION

Figure 1:
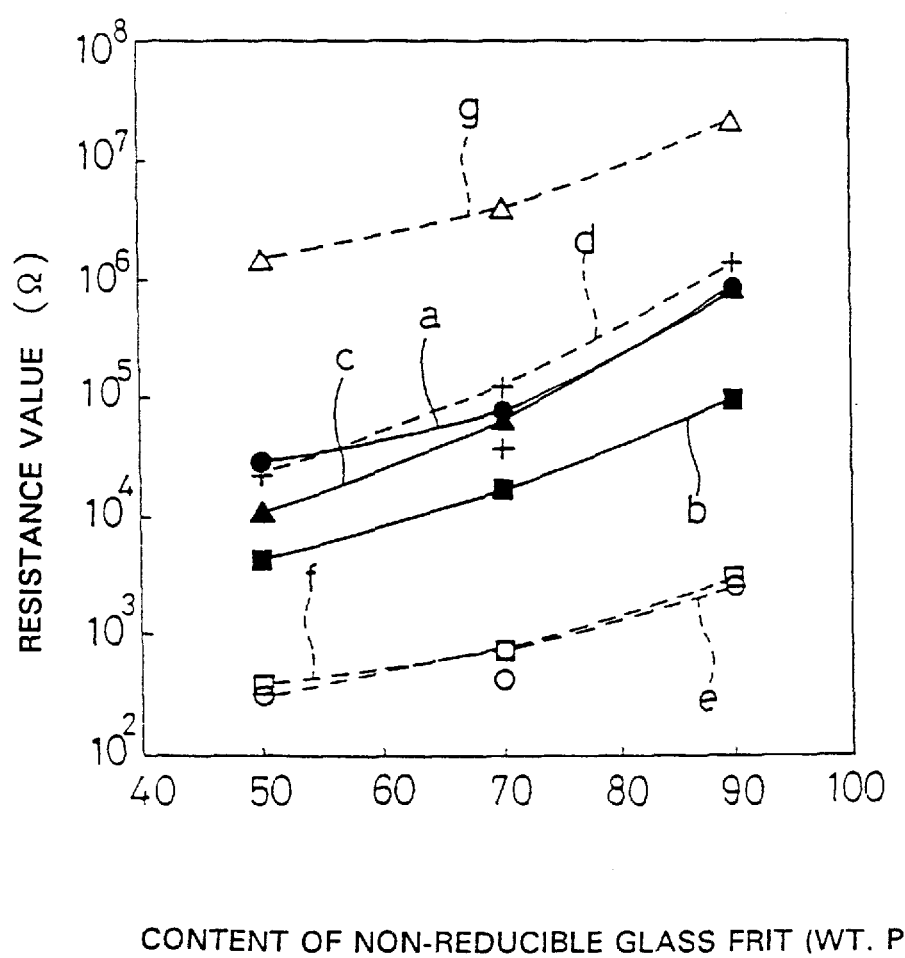
FIG. 1 is a graph showing the relationship between the resistance values of the resistors as produced in the examples and the comparative examples mentioned hereinunder and the amount of the glass frit added to the resistive pastes from which the resistors were produced, relative to the parameter of the molar ratio x.

A resistive material composition of the present invention comprises a resistive material (first resistive material) of the general formula $Ca_xSr_{1-x}RuO_3$ (where x is from about 0.25 to 0.75) and a characteristic-improving additive (second resistive material) of the general formula $La_ySr_{1-y}CoO_3$ (where y is from about 0.40 to 0.60). A resistive paste can be obtained by adding a non-reducible glass frit and an organic vehicle to the resistive material composition. It is possible to print and fire the resistive paste on a low-temperature-sintering substrate to form thereon a resistor having a high resistance value and a satisfactory TCR value that is near to 0 (zero). If conventional resistive pastes are printed and fired on such a low-temperature-sintering substrate, it is difficult to realize resistors having high resistance values and having satisfactory TCR values. The TCR values of the resistors formed from conventional resistive pastes on a low-temperature-sintering substrate are much more remote from 0 (zero), that is, they have large plus (+) or minus (−) values.

In the first resistive material of $Ca_xSr_{1-x}RuO_3$ that constitutes the resistive material composition of the present invention, x falls between about 0.25 mols and 0.75 mols and preferable about 0.3 to 0.6. This is because when x falls outside the defined scope, should the non-reducible glass frit content of the solid resistor composition increase, there is a rapid increase in the resistance value of the resistor formed from the composition and therefore the result is a worsening of the reproducibility of the resistance value of the resistor.

It is preferable that the particles of the first resistive material of $Ca_xSr_{1-x}RuO_3$ in the resistive material composition of the present invention have particle sizes falling between about 0.1 μm and 5 μm, and more preferably between about 0.5 μm and 3 μm. It is also preferable that the particles of the second resistive material of $La_ySr_{1-y}CoO_3$ in the composition have particle sizes falling between 0.5 μm and 5 μm, more preferably between about 1 μm and 3 μm.

The resistive material composition of the present invention comprises from about 5 to 25 parts by weight, relative to 100 parts by weight of the sum of the first resistive material and a non-reducible glass frit, of a characteristic-improving additive (second resistive material) of the general formula $La_ySr_{1-y}CoO_3$ (where y is from about 0.40 to 0.60 and preferably about 0.45 to 0.55). This is because if the amount of the second resistive material of $La_ySr_{1-y}CoO_3$ in the composition is less than 5 parts by weight, the material could not sufficiently exhibit the effect of increasing the resistance value of the composition, and when it is more than 25 parts by weight, the resistance value of the composition rapidly increases and the composition has a large minus (−) TCR value.

The non-reducible glass frit for use in the present invention may be selected from borosilicate glass and boroaluminosilicate glass with Ba, Ca or other alkaline earth metals, etc. It is desirable that the particles of the non-reducible glass frit have particle sizes falling between about 1 μm and 10 μm, and more preferably between about 1 μm and 5 μm.

Preferably, the ratio of the first resistive material to the non-reducible glass frit in the resistive material composition of the present invention is such that the first resistive material is from about 5 to 65 parts by weight and the non-reducible glass frit is from about 35 to 95 parts by weight. More preferably, the ratio is about 10:90 to 60:40. If so, the resistive paste comprising the composition can adhere and become fixed firmly onto a substrate, after having been coated and fired thereon, and the glass component does not flow out of the paste. If, however, the proportion of the non-reducible glass frit is lower than the defined range, the adhesiveness between the resistive paste comprising the composition and the substrate is low, or if it is higher than the defined range, the glass component flows out of the paste to worsen the solderability of electrodes on the substrate.

To prepare the resistive paste of the present invention, an organic vehicle is added to and kneaded with a mixture (solid component) comprising the first and second resistive materials and the non-reducible glass frit. This gives the resulting resistive paste the necessary printability. For this, employable are various organic vehicles which are generally used in ordinary resistive pastes for forming thick film resistors and which are prepared, for example, by dissolving an ethyl cellulose resin or acrylic resin in a terpene solvent such as α-terpineol or in a high-boiling point solvent such as kerosene, butyl Carbitol, Carbitol acetate or the like. If desired, additives may be added to the paste so as to make it thixotropic.

The resistive paste of the present invention can be coated and fired on even a low-temperature-sintering substrate having a composition comprising from about 15 to 75% by weight of BaO, from about 25 to 80% by weight of $SiO_2$, about 30% by weight or less of $Al_2O_3$, from about 1.5 to 5% by weight of $B_2O_3$ and from about 1.5 to 5% by weight of CaO, to form thereon a resistor having a high resistance value and a satisfactory TCR value.

The resistor formed by coating and firing the resistive paste of the present invention on a substrate has good adhesiveness to the substrate. Even if the resistor is formed on a low-temperature-sintering substrate, it still has a high effective sheet resistivity value and a satisfactory effective TCR value.

Next, the characteristics of the present invention are described in more detail with reference to the following examples, which, however, are not intended to restrict the scope of the present invention.

EXAMPLES (A) Formation of electrode patterns on alumina substrates:

A copper paste was screen-printed on insulating substrates made of alumina (alumina substrates) and fired in a nitrogen atmosphere to form electrodes (electrode patterns) thereon.

(B) Preparation of low-temperature-sintered substrates and formation of electrode patterns thereon:

BaO, $SiO_2$, $Al_2O_3$, CaO and $B_2O_3$ were combined at a weight ratio of 30:60:5:2:3, ground, mixed and fired at from 850° C. to 950° C. and again ground into powder. An organic binder was added to the thus-obtained powder, and the resulting mixture was formed into a sheet having a thickness of 128 μm by means of doctor-blading. The sheet was dried and then cut into green substrates each having a predetermined size. These green substrates were pre-sintered and sintered in an electric furnace having therein a nitrogen-steam atmosphere comprising nitrogen gas as the carrier gas and containing minor amounts of oxygen and hydrogen gasses ($N_2$ content: from 99.7 to 99.8%), at from 850° C. to 1000° C., to obtain low-temperature-sintered substrates. A copper paste was printed on each of these low-temperature-sintered substrates by means of screen-printing and fired in a nitrogen atmosphere to form electrode patterns thereon.

(C) Preparation of first resistive material samples:

As raw material substances for the first resistive materials, powdery $RuO_2$, $CaCO_3$ and $SrCO_3$ were combined at predetermined proportions to obtain a composition of $Ca_xSr_{1-x}RuO_3$ (where x is 0.3 or 0.6) and subjected to thermal synthesis by holding them in air at 1100° C. for 2 hours to obtain solid solutions. In this step of thermal synthesis, the heating speed was 3° C./min. Each of the thus-obtained solid solutions (synthetic products) was put into a partially-stabilized zirconia pot having grinding media and a pure water medium therein and set in a shaking mill, whereby the product was ground into powdery particles having a mean particle size of from 2 to 3 μm. Then, the resulting powder was dried. Thus were obtained various first resistive material samples.

(D) Preparation of non-reducible glass frit sample:

As raw material substances for non-reducible glass frit, $B_2O_3$, $SiO_2$, BaO, CaO and $Al_2O_3$ were prepared, mixed at a molar ratio of 36.0:31.7:18.0:9.3:5.0, melted at a temperature falling between 1200° C. and 1350° C., and then immediately put into pure water to rapidly cool the melt. This was next ground in a shaking mill into powdery particles having a mean particle size of 5 μm or less. Thus was obtained a non-reducible glass frit sample. In this example, the above-mentioned oxides were used as the raw materials. However, the corresponding carbonates can also be used as the raw materials.

(E) Preparation of characteristic-improving additive samples (second resistive material samples):

Powdery $La_2O$, $SrCO_3$ and $Co_2O_3$ were combined at predetermined proportions to realize a composition of $La_ySr_{1-y}CoO_3$ (where y is 0.5 for samples of the invention and y is 0.35 or 0.65 for comparative samples), mixed and ground. Then, the resulting mixtures were individually put into crucibles and subjected to thermal synthesis by holding them in air at 1050° C. for 5 hours. Each of the thus-obtained synthetic products was put into a partially-stabilized zirconia pot having grinding media and a pure water medium therein and set in a shaking mill, whereby the product was ground into powdery particles having a mean particle size of from 2 to 3 μm. Then, the resulting powders were dried to obtain characteristic-improving additive samples (second resistive material samples).

(F) Preparation of resistive paste samples:

The first resistive material sample, the characteristic-improving additive sample (second resistive material sample) and the non-reducible glass frit sample that had been prepared as described above were mixed at the various ratios shown in Table 1 below. An organic vehicle obtained by dissolving an acrylic resin in α-terpineol was added to and kneaded with the resulting mixture in a kneading device such as a three-roll mill or the like. The mixing ratio of the above-mentioned materials mixture to the organic vehicle was about 70:30 by weight. Thus were obtained various resistive paste samples.

TABLE 1

| Sample Number | Molar Ratio, x | Ratio of First Resistive material to Glass Frit (wt. %) | | Molar Ratio, y | Proportion of Second Resistive material (additive) | Type of Substrate | Sheet resistivity Value (Ω/square) | TCR (ppm/°C.) | |
|---|---|---|---|---|---|---|---|---|---|
| | | Resistive material | Glass Frit | | | | | between −55° C. and 225° C. | between 25° C. and 150° C. |
| *1 | 0.3 | 10 | 90 | — | 0 | alumina substrate | 1.45 M | −483 | −507 |
| *2 | 0.3 | 30 | 70 | — | 0 | alumina substrate | 125 K | 128 | 105 |
| *3 | 0.3 | 50 | 50 | — | 0 | alumina substrate | 23 K | 349 | 325 |
| *4 | 0.3 | 30 | 70 | — | 0 | alumina substrate | 38 K | 271 | 243 |
| *5 | 0.3 | 10 | 90 | — | 0 | low-temp.-sintered substrate | 2.6 K | 375 | 349 |
| *6 | 0.3 | 30 | 70 | — | 0 | low-temp.-sintered substrate | 732 | 595 | 571 |
| *7 | 0.3 | 50 | 50 | — | 0 | low-temp.-sintered substrate | 313 | 853 | 835 |
| *8 | 0.6 | 30 | 70 | — | 0 | low-temp.-sintered substrate | 421 | 538 | 517 |
| *9 | 0.3 | 10 | 90 | 0.5 | 3 | low-temp.-sintered substrate | 3.0 K | 351 | 330 |
| *10 | 0.3 | 30 | 70 | 0.5 | 3 | low-temp.-sintered substrate | 750 | 580 | 518 |
| *11 | 0.3 | 50 | 50 | 0.5 | 3 | low-temp.-sintered substrate | 370 | 830 | 807 |
| 12 | 0.3 | 10 | 90 | 0.5 | 10 | low-temp.- | 840 K | −405 | −423 |

TABLE 1-continued

| Sample Number | Ratio of First Resistive material to Glass Frit (wt. %) | | | Proportion of Second Resistive material (additive) | | Sheet resistivity | TCR (ppm/°C.) | |
|---|---|---|---|---|---|---|---|---|
| | Molar Ratio, x | Resistive material | Glass Frit | Molar Ratio, y | | Type of Substrate | Value (Ω/square) | between −55° C. and 225° C. | between 25° C. and 150° C. |
| 13 | 0.3 | 30 | 70 | 0.5 | 10 | low-temp.-sintered substrate | 78 K | 132 | 115 |
| 14 | 0.3 | 50 | 50 | 0.5 | 10 | low-temp.-sintered substrate | 29 K | 259 | 241 |
| 15 | 0.6 | 10 | 90 | 0.5 | 15 | low-temp.-sintered substrate | 98 K | −10 | −26 |
| 16 | 0.6 | 30 | 70 | 0.5 | 15 | low-temp.-sintered substrate | 17 K | 249 | 223 |
| 17 | 0.6 | 50 | 50 | 0.5 | 15 | low-temp.-sintered substrate | 4.3 K | 352 | 335 |
| 18 | 0.6 | 10 | 90 | 0.5 | 20 | low-temp.-sintered substrate | 956 K | −99 | −117 |
| 19 | 0.6 | 30 | 70 | 0.5 | 20 | low-temp.-sintered substrate | 68 K | 146 | 132 |
| 20 | 0.6 | 50 | 50 | 0.5 | 20 | low-temp.-sintered substrate | 11 K | 286 | 570 |
| *21 | 0.6 | 10 | 90 | 0.5 | 27 | low-temp.-sintered substrate | 22 M | −596 | −613 |
| *22 | 0.6 | 30 | 70 | 0.5 | 27 | low-temp.-sintered substrate | 4.1 M | −496 | −515 |
| *23 | 0.6 | 50 | 50 | 0.5 | 27 | low-temp.-sintered substrate | 1.5 M | −412 | −435 |
| *24 | 0.6 | 30 | 70 | 0.35 | 20 | low-temp.-sintered substrate | 1 G or more | — | — |
| *25 | 0.6 | 50 | 50 | 0.35 | 20 | low-temp.-sintered substrate | 135 M | −2700 | −2760 |
| *26 | 0.6 | 30 | 70 | 0.65 | 20 | low-temp.-sintered substrate | 1 G or more | — | — |
| *27 | 0.6 | 50 | 50 | 0.65 | 20 | low-temp.-sintered substrate | 356 M | −3210 | −3280 |

(G) Formation of resistor (resistor pattern) samples:

Next, the thus-obtained resistive pastes were individually screen-printed on an alumina substrate or the low-temperature-sintered substrate that had been prepared as described above. The resistive paste thus printed was such that the length was 1 mm, the width was 1 mm and the dry film thickness was about 20 μm. The substrates printed with the resistive paste were dried at 120° C. for 10 minutes and then fired in a tunnel furnace having a nitrogen atmosphere at a peak temperature of 900° C. for 10 minutes, whereby a resistor (resistor pattern) was formed on each substrate. Thus, resistor (resistor pattern) samples were prepared.

The sheet resistivity value and the temperature coefficients of resistance TCR (H/TCR: between 25° C. and 150° C., and C/TCR: between −55° C. and 25° C.) of each of the resistor samples Nos. 1 to 27 prepared as above were measured. Table 1 shows the data thus obtained.

In Table 1, the samples marked with (*) are comparative samples which are outside the scope of the present invention. Precisely, sample Nos. 1 to 8 do not contain the second resistive material; the amount of the second resistive material added to sample Nos. 9 to 11 is 3 parts by weight, i.e., smaller than the range defined in the invention; the amount of the second resistive material added to sample Nos. 21 to 23 is 27 parts by weight, i.e., larger than the range defined in the invention; the molar ratio y in $La_ySr_{1-y}CoO_3$ in sample Nos. 24 and 25 is 0.35, i.e., smaller than the range defined in the invention; and the molar ratio y in samples Nos. 26 and 27 is 0.65, i.e., larger than the range defined in the invention.

The sheet resistivity values in Table 1 were measured at 25° C. using a digital volt meter.

Figure 2:
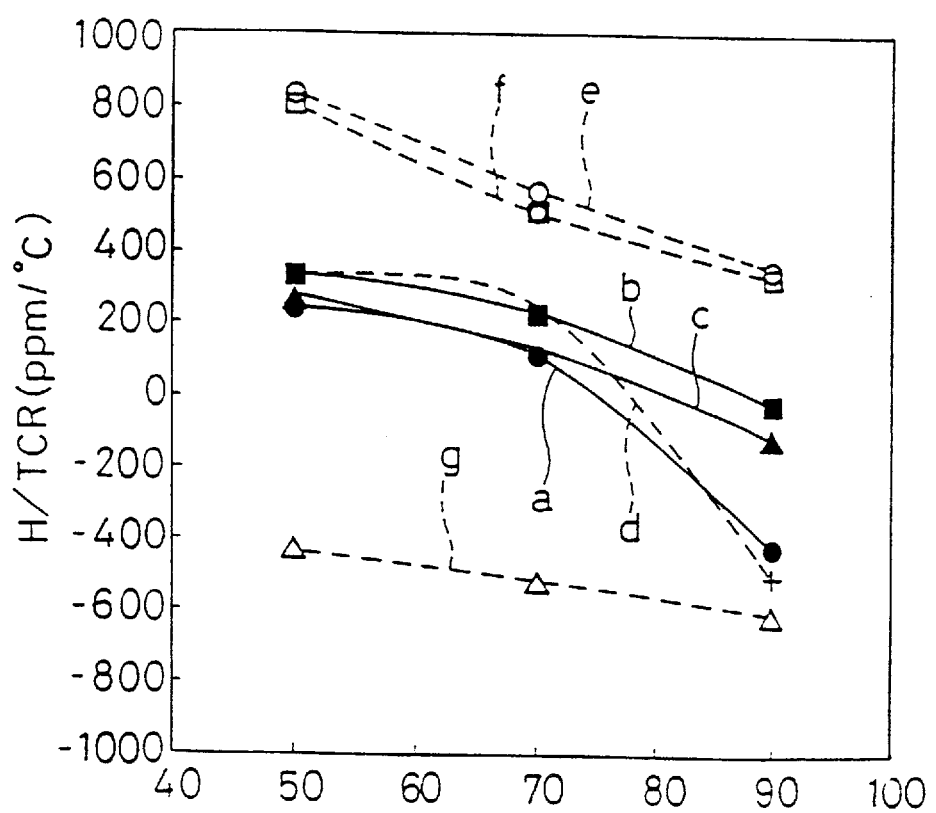
FIG. 2 is a graph showing the relationship between the TCR (H/TCR) values of the resistors as produced in the examples and the comparative examples mentioned hereinunder and the amount of the glass frit added to the resistive pastes from which the resistors were produced, relative to the parameter of the molar ratio x.

FIG. 1 shows the relationship between the resistance values of the resistors as produced herein and the amount of the glass frit added to the resistive pastes from which the resistors were produced, relative to the of the molar ratio parameter x. FIG. 2 shows the relationship between the H/TCR values of the resistors as produced herein and the amount of the glass frit added to the resistive pastes from which the resistors were produced, relative to the molar ratio parameter x. The details of the code symbols (a to g) applied to the lines in FIGS. 1 and 2 are shown in Table 2 below, where the type of the substrate used, the molar ratio x in the first resistive material sample ($Ca_xSr_{1-x}RuO_3$) the molar ratio y in the characteristic-improving additive (second resistive material—$La_ySr_{1-y}CoO_3$) and the amount of the second characteristic-improving additive added are shown. In Table 2, the samples marked with (*) are comparative samples which are outside the scope of the present invention.

TABLE 2

| Code | Type of Substrate | Molar Ratio x in First Resistive material | Molar Ratio y in Characteristic-improving Additive | Amount of Characteristic-improving Additive Added (wt. %) |
|---|---|---|---|---|
| a | low-temp.-sintered substrate | 0.3 | 0.5 | 10 |
| b | low-temp.-sintered substrate | 0.6 | 0.5 | 15 |
| c | low-temp.-sintered substrate | 0.6 | 0.5 | 20 |
| *d | alumina substrate | 0.3, 0.6 | — | 0 |
| *e | low-temp.-sintered substrate | 0.3, 0.6 | — | 0 |
| *f | low-temp.-sintered substrate | 0.3 | 0.5 | 3 |
| *g | low-temp.-sintered substrate | 0.6 | 0.5 | 27 |

From Tables 1 and 2 and FIGS. 1 and 2, it is observed that the resistance values of the comparative resistor samples formed on the low-temperature-sintered substrates, even though the molar ratio x in the first resistive material $Ca_xSr_{1-x}RuO_3$ therein is 0.3 or 0.6, are lower than about 1/100 of those formed on the alumina substrates and the TCR values of the former are greatly shifted to plus (+) values. Therefore, it is understood that these comparative resistor samples are unsuitable for practical use. As opposed to these, the resistor samples of the present invention containing $La_ySr_{1-y}CoO_3$ that were formed on the low-temperature-sintered substrates have high resistance values and have TCR values which are on the same level as those of the resistor samples formed on the alumina substrates or are nearer to zero (ppm/°C.) than the latter.

It is also seen that when the proportion of the characteristic-improving additive (second resistive material) $La_ySr_{1-y}CoO_3$ to the sum of the first resistive material and the non-reducing glass frit is less than 5/100 by weight, the effect of the additive to increase the resistance values of the resistors is insufficient and when it is more than 25/100 by weight, the resistance values of the resistors rapidly increase and the TCR values thereof are greatly shifted to minus (−) values. From these, it is understood that the amount of the characteristic-improving additive (second resistive material) to be added is preferably between 5 and 25 parts by weight.

In the above-mentioned examples, the non-reducible glass frit used comprised $B_2O_3$, $SiO_2$, BaO, CaO and $Al_2O_3$ at a molar ratio of 36.0:31.7:18.0:9.3:5.0. However, the components constituting the non-reducible glass frit for use in the present invention and the compositional ratio of the components are not limited to only the illustrated one but, needless-to-say, other non-reducible glass frits comprising any other components and having any other compositional ratios can also be used in the present invention.

The above-mentioned examples have demonstrated the formation of the resistor samples on the low-temperature-sintered substrate comprising BaO, $SiO_2$, $Al_2O_3$, CaO and $B_2O_3$ at a ratio of 30:60:5:2:3 by weight. However, the substrate on which the resistors of the present invention are formed is not limited to only the low-temperature-sintered substrate having the composition mentioned above. Needless-to-say, the present invention is applicable to the formation of the resistors on other various substrates or bases made of other various materials.

The present invention is not limited to only the above-mentioned examples with respect to the other various aspects. For example, the mixing ratio of the first resistive material and the non-reducible glass frit, the amount of the characteristic-improving additive (second resistive material) to be added, and the temperature conditions and the atmosphere conditions for firing the resistive paste can be variously changed or modified within the scope and the spirit of the present invention.

As has been described in detail hereinabove, the resistive material composition of the present invention comprises a resistive material (first resistive material) of the general formula, $Ca_xSr_{1-x}RuO_3$ (where x is from about 0.25 to 0.75 mols) and a characteristic-improving additive (second resistive material) of the general formula, $La_ySr_{1-y}CoO_3$ (where y is from about 0.40 to 0.60 mols), and the resistive paste to be prepared by adding a non-reducible glass frit and an organic vehicle to the composition can be formed into resistors having high resistance values and having TCR values near to zero even on low-temperature-sintering substrates. However, if conventional resistive pastes are coated and fired on such low-temperature-sintering substrates, it is difficult to realize resistors having high resistance values and having satisfactory TCR values. The TCR values of the resistors formed from conventional resistive pastes on low-temperature-sintering substrates are much more remote from zero, that is, they are large plus (+) or minus (−) values.

Where the resistive paste of the present invention comprises the first resistive material and the non-reducible glass frit at such a ratio that the former is from about 5 to 65 parts by weight and the latter is from about 35 to 95 parts by weight, along with an organic vehicle, and where it is used to form resistors on a low-temperature-sintering substrate, the adhesiveness between the resistors formed and the substrate is much improved and it is possible to inhibit or prevent the glass component from flowing out of the resistors formed. For these reasons, preferred is the embodiment of the resistive paste comprising the first resistive material and the non-reducible glass frit at said ratio.

Concretely, the resistive paste of the present invention can be formed into resistors having high resistance values and having TCR values near to zero on ceramic-glass composite substrates such as a low-temperature-sintering substrate having a composition comprising from about 15 to 75% by weight of BaO, from about 25 to 80% by weight of $SiO_2$, about 30% by weight or less of $Al_2O_3$, from about 1.5 to 5% by weight of $B_2O_3$ and from about 1.5 to 5% by weight of CaO.

While the invention has been described in detail and with reference to specific embodiments thereof, it will be apparent to one skilled in the art that various changes and modifications can be made therein without departing from the spirit and scope thereof.

What is claimed is:

1. A resistive material composition comprising a first resistive material of the general formula $Ca_xSr_{1-x}RuO_3$ in which x is from about 0.25 to 0.75, and a characteristic-improving additive of the general formula $La_ySr_{1-y}CoO_3$ in which y is from about 0.40 to 0.60.

2. A resistive material composition as claimed in claim 1, in which x is about 0.3 to 0.6 and y is about 0.45 to 0.55.

3. A resistive material composition as claimed in claim 1, containing a non-reducible glass frit and in which there is from about 5 to 25 parts by weight, relative to 100 parts by weight of the sum of the first resistive material and the non-reducible glass frit, of the characteristic-improving additive.

4. The resistive material composition as claimed in claim 3, wherein the ratio of the first resistive material to the non-reducible glass frit is from about 65:35 to 5:95 by weight.

5. The resistive material composition as claimed in claim 4, wherein the ratio of the first resistive material to the non-reducible glass frit is from about 60:40 to 10:90 by weight, x is about 0.3 to 0.6 and y is about 0.45 to 0.55.

6. A resistive paste comprising the resistive material composition as claimed in claim 5 in combination with an organic vehicle.

7. A resistive paste comprising the resistive material composition as claimed in claim 4 in combination with an organic vehicle.

8. A resistive paste comprising the resistive material composition as claimed in claim 3 in combination with an organic vehicle.

9. A low-temperature-sintering substrate having the resistive paste as claimed in claim 8 thereon.

10. The substrate as claimed in claim 9 in which the low-temperature-sintering substrate has a composition comprising from about 15 to 75% by weight of BaO, from about 25 to 80% by weight of $SiO_2$, about 30% by weight or less of $Al_2O_3$, from about 1.5 to 5% by weight of $B_2O_3$ and from about 1.5 to 5% by weight of CaO.

11. A low-temperature-sintering substrate having the resistive paste as claimed in claim 7 thereon.

12. A low-temperature-sintering substrate having the resistive paste as claimed in claim 6 thereon.

13. A resistor comprising the fired resistive paste as claimed in claim 6.

14. A resistor comprising the fired resistive paste as claimed in claim 7.

15. A resistor comprising the fired resistive paste as claimed in claim 8.

16. A low-temperature-sintering substrate having the resistor as claimed in claim 15 thereon.

17. A low-temperature-sintering substrate having the resistor as claimed in claim 14 thereon.

18. A low-temperature-sintering substrate having the resistor as claimed in claim 13 thereon.

* * * * *